United States Patent Office 3,094,566
Patented June 18, 1963

3,094,566
TETRANITRO ORGANIC COMPOUNDS AND PREPARATION OF SAME
Marvin H. Gold, Covina, and Herman Plaut, Los Angeles, Calif., assignors, by mesne assignments, to Aerojet-General Corporation, Azusa, Calif., a corporation of Ohio
No Drawing. Filed Dec. 20, 1949, Ser. No. 134,128
6 Claims. (Cl. 260—644)

This invention relates to a new class of organic nitro-compounds having a large number of nitro-groups in the molecule, and has for its object to provide a series of nitro-compounds containing at least 4 nitro-groups in the molecule.

A related object is to provide a process for synthesizing these compounds.

According to our invention we have succeeded in making compounds belonging to the class having the general formula

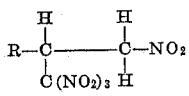

in which R may be a hydrogen, an alkyl group, an aryl group, an aralkyl group or a heterocyclic group.

We have succeeded in synthesizing the members of this class of compounds by treating with nitroform $CH(NO_2)_3$, a primary nitro olefin having the general formula:

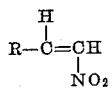

where R may be hydrogen, an alkyl group, an aryl group, an aralkyl group or a heterocyclic group.

We have found that these new compounds can be made in the following general manner: A solution containing the primary nitroolefin in a suitable solvent, such as a liquid alcohol, is cooled to a low temperature. This solution is treated with the stoichiometric amount of nitroform and the low temperature is maintained for a sufficient period of time to absorb any heat of reaction. The temperature is then allowed to rise to room temperature and then the mixture is refluxed. The resulting product may then be separated from the solution by either evaporation, distillation or other known standard procedures.

The synthesis of specific members of this series of compounds is set forth in detail in the following examples, although the invention in its broader aspects is not limited to these examples:

EXAMPLE 1

Formation of 1,1,1,3-Tetranitropropane

A solution of one mole nitroethylene

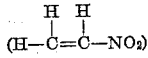

(72 grams) is dissolved in 150 ml. methanol and is cooled to 0° C. One mole of nitroform (150 grams), dissolved in 150 ml. of methanol, is slowly added to the olefin solution while maintaining the temperature at 0° C. The resulting solution which has become a dark orange color, is allowed to stand at 0° C. for about 30 minutes to control the heat of reaction, after which the solution is allowed to rise slowly to room temperature. It is then refluxed for one hour. The tetranitropropane

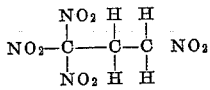

is recovered from the solution by evaporation under reduced pressure as a solid crystalline residue. The product obtained in this manner may be purified by recrystallization from petroleum ether or by precipitation from solvents such as acetic acid or methanol with water.

The physical properties of tetranitropropane are as follows: The material is a colorless crystalline solid having a melting point between 50° and 51° C.; the density at 25° C. is 1.72 for crystals obtained by dissolving in acetic acid, drowning the solution in water, washing the solution and drying; the percentage of nitrogen found in the compound was 24.91 while the calculated percentage was 25.0; the freezing point of the pure material by extrapolation was 50.7° C. No marked decomposition of the compound occurred at 134.5° C. over a period of 5 hours. The heat of combustion was 17.10 cal./g. The solubilities at 25° C. are as follows: in water, 0.4% by weight; in acetone, 84.0% by weight; in toluene, 48.0% by weight; and in heptane 0.5% by weight. The structure of the compound was proved by reduction with tin and hydrochloric acid to form a tin salt complex of 1,3-diamino propane. This substance was identified by conversion to the known dibenzamide having a melting point of 146° C. to 148° C. and also by converting it to the dibenzene-sulfonamide having a melting point of 95° C.

Tetranitropropane alone is an exceedingly good explosive since it has a zero oxygen balance.

EXAMPLE 2

Formation of 2-Phenyl-1,1,3-Tetranitropropane

One mole of ω-nitrostyrene ($C_6H_5CH=CHNO_2$) (149 grams) was suspended in 150 ml. of methanol and maintained at 0° C., while one mole (151 grams) of nitroform in 100 ml. of methanol was added. After permitting the solution to stand for 30 minutes at 0° C. the suspension was allowed to rise to room temperature and it was then refluxed for one hour. The solid matter dissolved and reacted. Phenyl-tetranitropropane

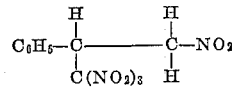

is obtained from the solution by drowning in an excess of water and the solid 2-phenyl-1,1,1,3-tetranitropropane which separates is filtered off. The product may be conveniently purified by crystallization from methanol or a similar solvent.

2-phenyl-1,1,1,3-tetranitropropane is a colorless crystalline solid which upon analysis gave the following results:

| Percent | Calculated | Found |
|---|---|---|
| C | 36.01 | 36.27 |
| H | 2.69 | 2.70 |
| N | 18.67 | 18.30 |

The purified compound melted at 87° C. when recrystallized from hexane.

It is apparent that the compounds made possible by our invention provide a very useful series of synthetic materials which can be used as intermediates to synthesize other substances, or employed as the principal component of an explosive, a rocket fuel, etc. The compounds have an extremely high oxygen balance which makes them self-combustible rendering them useful either alone, or with the addition of other oxidizer components, as fuel for powering rocket motors, or as explosives.

A further advantage of these types of compounds is that they are substantially stable to heat and shock, making them safer to handle than other forms of highly oxidized organic compounds.

The following substances are prepared in a manner similar to Examples 1 and 2.

1,1,1,3-tetranitro-2-methyl propane

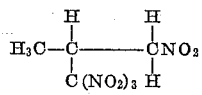

made by reacting 1-nitropropene

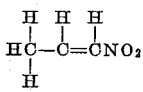

with nitroform.

1,1,1,3-tetranitro-2-furyl propane

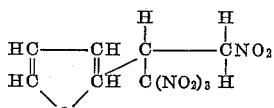

made by reacting 1-nitro-2-furyl ethylene

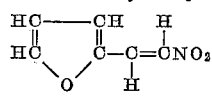

with nitroform.

1,1,1,3-tetranitro-2-thienyl propane

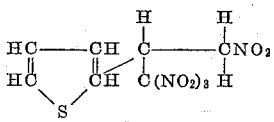

made by reacting 1-nitro-2-thienyl ethylene

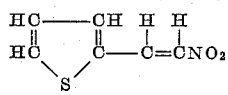

with nitroform.

An example of a highly substituted compound is 1,1,1,3-tetranitro-2-trinitrophenyl propane

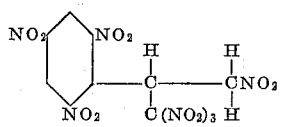

produced by reacting 1-nitro-2-trinitrophenyl ethylene

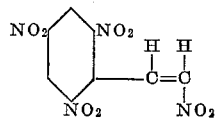

with nitroform.

It is apparent that the compounds made possible by out invention provide a useful series of synthetic substances which may be used as intermediates to synthesize other substances, or some of the materials can be employed as principal components of an explosive, a rocket fuel, etc.

The compounds are ordinarily in good oxygen balance which render them self-combustible and many compounds can be used alone or in combination with other oxidizing compounds as fuels for powering rocket motors or in some cases as explosives.

It appears that the compounds of this type are substantially stable to heat and shock which makes them safer to handle than other forms of highly oxidized material.

We claim:
1. A method of forming a composition of matter having the formula

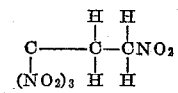

which comprises admixing mononitroethylene dissolved in methanol, adding to this solution nitroform while maintaining the temperature not higher than about 0° C., permitting the temperature to rise to room temperature, refluxing the mixture and isolating the product.

2. A method of forming a composition of matter having the formula

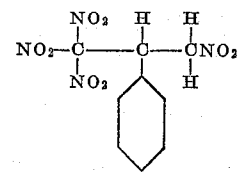

which comprises admixing ω-nitro styrene dissolved in methanol with nitroform while maintaining the temperature at about 0° C., permitting the temperature to rise to room temperature, refluxing the mixture until reaction is completed and isolating the resulting product.

3. The method of preparing polynitro substituted compounds having the general formula:

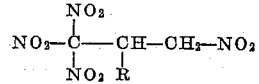

which comprises refluxing in an inert organic solvent, a mixture of nitroform and a nitroolefin having the general formula:

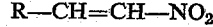

wherein R is a radical selected from the group consisting of hydrogen, carbocyclic aryl, m-nitro substituted carbocyclic aryl, furyl, thienyl, and lower alkyl radicals.

4. The method of claim 3 wherein the solvent is a liquid organic alcohol.

5. The method of preparing 1,1,1,3-tetranitropropane which comprises refluxing a mixture of nitroform and mononitroethylene in the presence of an enert organic solvent.

6. The method of preparing 2-phenyl-1,1,1,3-tetranitropropane which comprises refluxing a mixture of ω-nitrostyrene and nitroform in the presence of an inert organic solvent.

References Cited in the file of this patent

UNITED STATES PATENTS 2,583,048   Hannum et al. _____ Jan. 22, 1952